United States Patent [19]

Zinsmeyer et al.

[11] Patent Number: 5,280,309

[45] Date of Patent: Jan. 18, 1994

[54] SINGLE DEGREE OF FREEDOM BELT DRIVE TENSIONING SYSTEM FOR A PLOTTER APPARATUS

[75] Inventors: Charles D. Zinsmeyer, Austin; Marlan L. Schmidt, Pflugerville, both of Tex.; Gregory L. Spaulding, Manhattan, Kans.

[73] Assignee: Summagraphics Corporation, Conn.

[21] Appl. No.: 713,703

[22] Filed: Jun. 11, 1991

[51] Int. Cl.⁵ .................... G01D 15/16; G01D 15/18
[52] U.S. Cl. .................. 346/139 R; 248/665; 310/91; 474/101; 474/113; 474/114; 474/115
[58] Field of Search ............ 346/29, 136, 139 R; 474/101, 113–117, 133–136, 138; 310/51. 91; 248/562, 665; 74/89.22

[56] References Cited

U.S. PATENT DOCUMENTS

| | | |
|---|---|---|
| 1,169,133 | 1/1916 | De Kleist et al. ............ 474/115 |
| 1,282,198 | 10/1918 | Davis ............................ 474/115 |
| 1,551,377 | 8/1925 | Dunlap et al. ................ 474/115 |
| 1,694,868 | 12/1928 | Sawyer ......................... 474/114 X |
| 2,074,135 | 3/1937 | Warner ......................... 474/114 X |
| 2,594,674 | 4/1952 | Nietfeld ........................ 474/114 X |
| 3,421,724 | 1/1969 | Cornell ......................... 474/114 X |
| 4,678,953 | 7/1987 | Johnson ........................ 310/91 |
| 4,806,953 | 2/1989 | Regas et al. .................. 346/136 |

Primary Examiner—A. T. Grimley
Assistant Examiner—William J. Royer
Attorney, Agent, or Firm—Rosen, Dainow & Jacobs

[57] ABSTRACT

A belt-drive tensioning system for a motor drive positioning system, especially for X-Y digital plotters. The tensioning system employs spring-loading involving motion along only one translational direction to accurately preset and maintain constant the desired belt tension. Preferred embodiments to provide a self-contained modular unit include a dual plate assembly in roller-bearing relationship, and the use of V-shaped mounting springs.

24 Claims, 4 Drawing Sheets

SINGLE DEGREE OF FREEDOM BELT DRIVE TENSIONING SYSTEM FOR A PLOTTER APPARATUS

This invention relates to a belt-drive tensioning system, and in particular to belt-drive tensioning systems that are useful in apparatus that impose high demands on the accuracy and repeatability of a motor drive positioning system, such as in X-Y plotters.

BACKGROUND OF THE INVENTION

There are many applications for positioning systems having accurate controllable motor drives. One common application is in X-Y plotters. The typical plotted employs an X-axis friction drive mechanism for the chart or like media, and a Y-axis direct drive for the pen, the combination of movements allowing the plotter to produce virtually any kind of line drawing on the chart.

One of the essential conditions for the drive mechanisms in such apparatus is that there should be minimum slippage and backlash in the system. This is required because the execution of a line drawing by the plotter requires that the chart continuously move back and forth in the X-direction, and it is important that the X-axis drive mechanism be capable of repeatedly positioning the chart to very close tolerances at the selected positions along the X-axis. The same requirement, of course, exists for the Y-axis drive mechanism for the pen.

These problems are exacerbated when a belt-pulley system is employed in the drive mechanism. The latter system is preferred mainly because it reduces the cost of the drive mechanism, and it somewhat simplifies the location of parts in a housing that historically keeps getting smaller and smaller. But, to satisfy the requirements indicated above with a belt-pulley drive system requires a mechanism not only for providing the proper tension on the belt, but also for maintaining the belt tension at the correct value and substantially constant during the lifetime of the product.

In one known system, a spring-leaded, cam-driven, idler roller operates against the outer surface of the belt producing a reverse wrap which provides the required tension. However, this arrangement offers certain disadvantages.

SUMMARY OF THE INVENTION

The chief object of the invention is a drive mechanism with a belt-drive capable of providing accurate and constant tensioning of the belt to produce a relatively low-cost yet highly accurate drive mechanism.

In accordance with one aspect or the invention, in a motor-drive mechanism employing a belt and pulley drive, means are provided for accurately tensioning the drive belt. These means comprise spring-loading the mechanism in such manner that the belt-tensioning means is capable of substantially only a single degree of freedom in its motion.

In accordance with a further aspect of the invention, the motor mount for the drive mechanism is constructed so as to provide a purely translational movement of the motor shaft containing one of the belt pulleys along a line connecting the centers of the shafts for both of the belt pulleys.

The invention is based on the concept of mounting the motor in such manner that it is capable of substantially only a translational movement. Put another way, the mounting is such as to provide a torsionally rigid construction. Confining the movements of the movable part of the system which provides the belt tension to a direction and along a line connecting the centers of the belt pulleys ensures that the belt tension can be accurately preset and maintained by the choice of the springs used to provide the spring loading. Another underlying concept is to provide the single preloaded degree of freedom to a motor support as an integral part of the motor assembly.

In accordance with a further feature of the invention, the system is constructed so that it is essentially runout insensitive. This is achieved by employing a motor mount in which the spring-loaded element so-to-speak floats on its support. As a result, inevitable imperfections in the belt-drive mechanism are compensated by the ability of this floating element in the system to adjust to the imperfections. This adjustment when confined along one axis only, namely, the translational axis running between the pulley centers, with the assembly exhibiting high stiffness in all other translational and rotational directions, enables this feature of the invention to be carried out without loss of rotational registration and in a surprisingly inexpensive manner.

In a preferred embodiment in accordance with this aspect of the invention, the motor is mounted in a plate which bears by means of balls serving as roller bearings against an outer plate which is mounted to the apparatus, with several springs biasing the inner plate with respect to the outer plate. The arrangement of opposed plates are such as to allow the inner plate to follow essentially only translation movements with respect to the fixed outer plate. Preferably, the balls run in races which extend parallel to the desired translational axis.

In accordance with still another aspect of the invention, the motor and its spring-loaded mount are constructed to form a self-contained pre-assembled modular unit that can be assembled or disassembled from the apparatus containing the shaft to be driven as a single unit. This helps reduce assembly costs, and also simplifies maintenance by allowing field replacement of a malfunctioning unit.

In accordance with yet another aspect of the invention, the spring loading is provided by mounting the motor on specially-configured leaf springs which offer a relatively low stiffness and thus allowing movement substantially in a single translational direction, while providing a relatively high stiffness in all other directions. In a preferred form, the leaf springs have a generally folded configuration.

BRIEF DESCRIPTION OF THE DRAWINGS

The above description as well as further objects, features and advantages of the present invention will be more fully understood by reference to the following detailed description of presently preferred embodiments of the present invention, taken in conjunction with the accompanying drawings.

In the drawings.

DETAILED DESCRIPTION OF THE PREFERRED EMBODIMENTS

While the invention is applicable to any kind of a drive mechanism employing a belt-pulley system and capable of highly-accurate operation, an especially important application for the belt-drive mechanism of the invention is in X-Y digital plotters. The environment of a plotter will be used in order to illustrate the preferred embodiments of the invention, though again it is emphasized that this is merely exemplary and it is not intended for the invention to be limited thereto Since essentially everything but the actual drive mechanism of existing digital plotters remain unchanged when the belt-drive mechanism of the invention is substituted, it is unnecessary to provide a description of the well-known plotter itself. For those who desire a more detailed description of a typical nigh-quality plotter, reference is had to U.S. Pat. No. 4,734,716, whose contents are hereby incorporated by reference.

In the environment of a digital plotter, the invention has to do with the drive mechanism for either the typical X-axis friction drive or the Y-axis direct pen drive. The basic system for one embodiment is illustrated schematically in FIG. 1. In this embodiment, the motor translates under spring tension guided by a plurality of grooved plates separated by balls. As will be observed, the system comprises a conventional DC motor 10 having a shaft 11 on which is mounted a pulley 12. A second shaft 14 which is spaced from the motor shaft 11 is connected to the item (not shown) to be driven, a friction wheel in case of a friction drive or a gear or other linkage which moves the pen. That second shaft 14 is mounted for rotation in suitable bearings 15 fixed in a wall of the apparatus, frame or housing, indicated at 16. The shaft 14 is provided with a pulley 18, the size of which, in the conventional way, relatively to the pulley size of the first shaft determines the relative speed of the driven shaft 14 with a given motor speed.

A conventional belt 20 interconnects the two pulleys 12, 18. The object is to provide a way to pre-tension the belt 20 that will enable that belt pre-tension to be accurately set, produce zero effect on registration, and provide accommodation for manufacturing tolerances and drive component variation-runout during the life of the product. In addition, the belt pretension should be maintained essentially constant for the typical small motions encountered which are on the order of a few thousandths of an inch. Obviously, the greater the excursion the greater the tension variation. It's proportional to spring rate. In accordance with one form of the present invention, the motor 10 is mounted on an inner plate 21. The inner plate 21, in turn, rides over an outer plate 22 which is secured to the plotter frame 16 and thus is essentially fixed. Separating the two plates are roller balls 23 which ride in and are guided by linear grooved races 51, 52 (shown in FIG. 3), so there is a ball bearing relationship between the two plates. One of the plates is also provided with projections engaging slots in the other plate (not shown in FIG. 1). The linear grooved bearing races 51, 52 restrain the movement of the inner plate 21 with respect to the outer plate 22 to a direction only along the axes of the races, which are parallel to a straight line interconnecting the axes of the driving 11 and driven 14 shafts. Spring means 26 are mounted so that the inner plate 21 with attached motor 10 is pulled or biased in a direction parallel to the line 25, shown by arrow 27. As will be evident from this figure, this arrangement ensures that the inner plate 21 essentially floats on the outer plate 22 and thus can adjust to any imperfections in the system that would tend to change the belt tension. Important however is the fact that this floating action of the inner plate 21 and motor 10 is confined to essentially one translational direction 25 extending between the pulley centers, with the result that the outer plate can be said to support the movable pulley 12 in substantially a torsionally-rigid manner.

To understand how the invention operates and the improvement it is capable of in a conventional plotter environment, one should consider the following.

In a belt and pulley drive system, pretensioning of the drive belt must occur to prevent the drive belt from slipping on the drive pulleys. This pretensioning or preload as it is also called is usually measured in units, such as pounds, of force and is dictated by several factors including belt width, distance between pulley centers, and power. The primary function of the belt-tensioning system of the invention is to provide the correct or design preload to the drive belt.

But there is another important factor. In any rotating member, there exists a certain amount of what is called runout. Runout stems from imperfect manufacturing and represents the degree of eccentricity measured on the rotating member. Put another way, runout represents the amount of "out-of-roundness" in a rotating body. The pulleys in a belt/pulley-drive system are not different from other drive elements. They are not perfectly round and the geometric center is always displaced, if even slightly, from the rotational center, so that the pulley is always at least slightly eccentric. For some belt/pulley systems this may not be critical. However, for those belt/pulley systems with certain kinds of belts, the problem is aggravated; this is particularly the case for so-called Keviar belts, a plastic material, which is quite popular because of its long life and resistance to deterioration, but which exhibits very high stiffness. Because of this high stiffness, or low compliance, pulleys with runout even as small as 0.002 inches can cause a Kevlar-drive system with a fixed pulley center-to-center distance (not spring-loaded) to experience wide swings in belt tension. This varying belt tension can have adverse effects on plot quality, bearing life, machine noise, and belt life, among other things. The belt-tensioning system in accordance with the present invention can be fairly described as runout insensitive, which means that it can adjust to runout by movement of the motor mount in such manner as to maintain essentially a constant belt tensioning.

Figure 1:
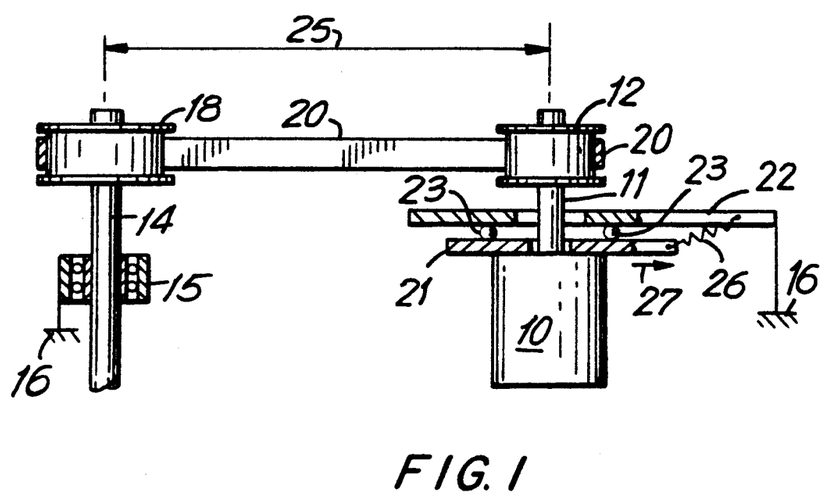
FIG. 1 is a schematic view of one form of spring-loaded belt-pulley drive mechanism in accordance with the invention.
Figure 2:
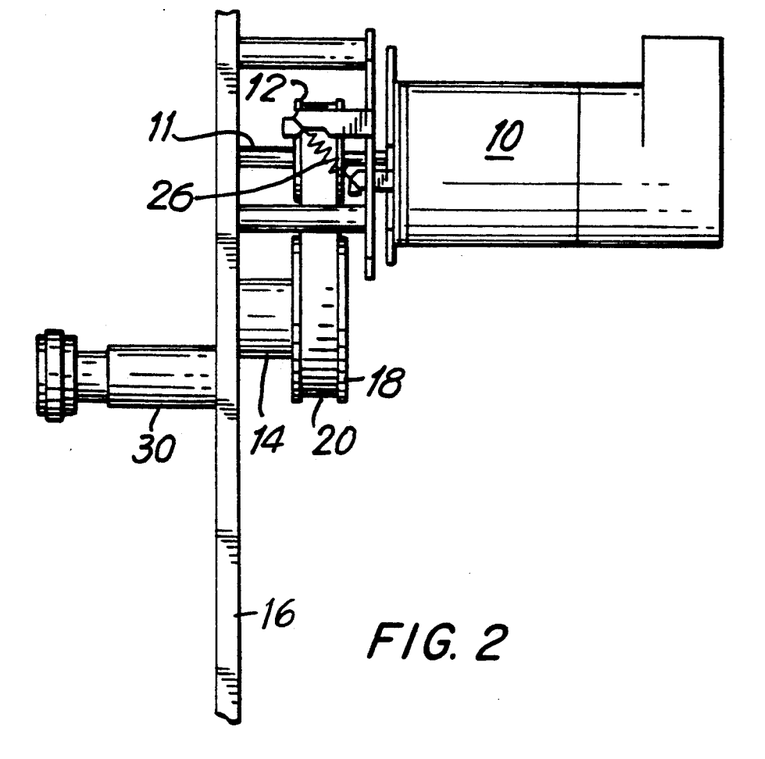
FIG. 2 is a side view of the drive mechanism of FIG. 1 shown installed on a plotter.

FIG. 2 illustrates the motor drive of FIG. 1 mounted on the side of a plotter frame 16 containing a shaft 30 journalled in the frame and carrying, e.g., a friction wheel for driving the media. The shaft 30 is geared (not shown) to the driven shaft 14 with pulley 18 rotated by the belt 20 be the pulley 12 on the shaft 11 of the motor 10. The spring means 26 pulls the motor 10 away from the driven shaft 14 to provide the belt preload.

The motor 10 and its spring-loading mechanism 21, 22, 23, and 26 form a self-contained modular assembly 32 for mounting directly to the plotter frame. That modular assembly is shown assembled in FIG. 4, and in an exploded view in FIG. 3, with the same reference numerals as used before designating corresponding parts. The motor 10 is a conventional D.C. motor coupled to an encoder section 33 at its rear. The inner plate 21 is affixed to the motor housing 34 via an intermediate plate 35 by means of screws. The inner plate 21 contains two projecting members 37 with hook ends 38 which pass through openings 39 in a ball retainer plate 40 and pass through, with clearance, slots 41 in the outer plate 22. The spring-loading is accomplished by two tension springs 26 extending between the hook ends 38 of the projections 37 and fixed tabs 43 on the outer plate 22. The outer plate 22 is provided with suitable mounting holes 44 for mounting directly to the plotter frame 16 or to stand-offs on the frame.

Figure 3:
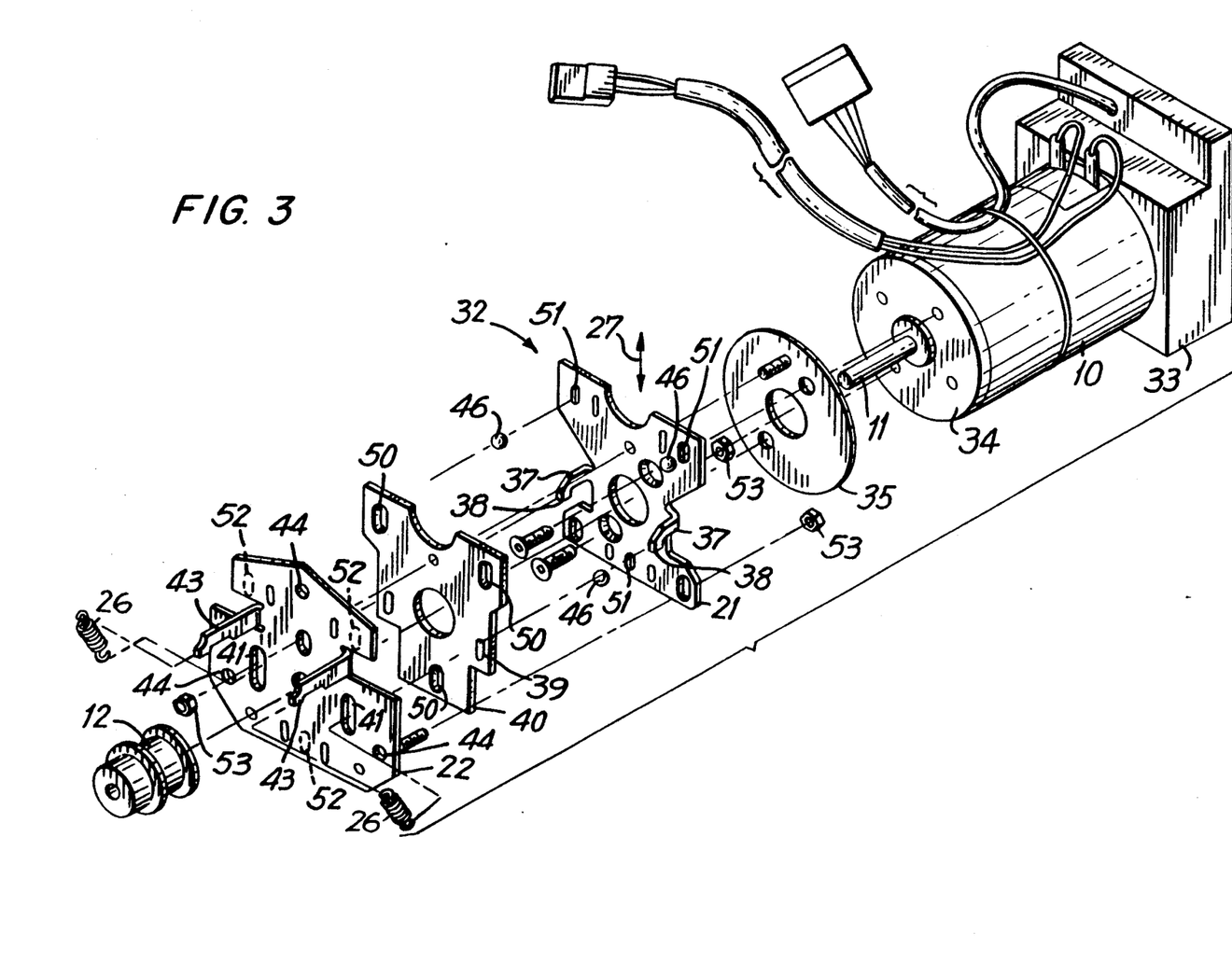
FIG. 3 is an exploded view of the self-contained springloaded motor mount of FIG. 1.
Figure 4:
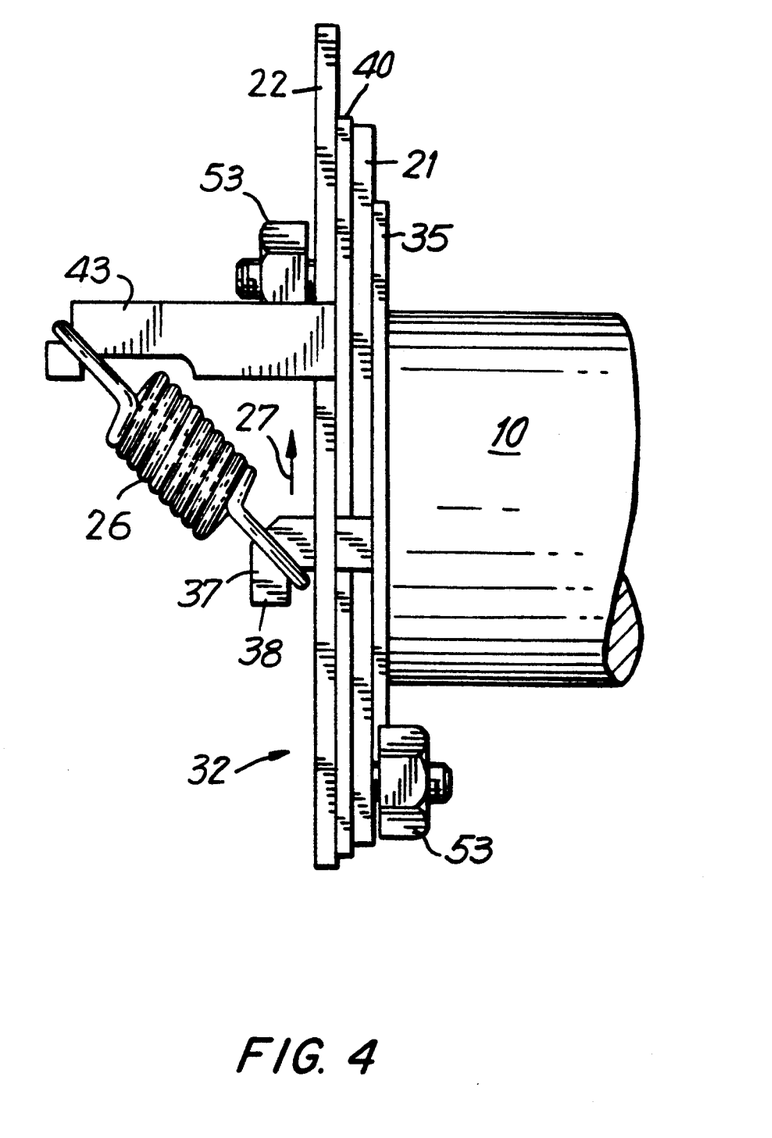
FIG. 4 is a side view of the assembled unit of FIG. 3.

The inner plate 21 "floats" and is guided over the outer plate 22 by means of three bearing ball 46, held by means of through holes 50 in retainer 40, and riding in vertically-oriented grooved races 51 in the inner plate 21 and 52 in the outer plate 22. Again, the vertically-oriented races 51, 52 constrain ball, and therefore the mating plate, movement in a direction parallel to arrow 27. Nuts 53 are used to prevent excessive gapping of the assembly which would cause the balls to fall out during, for example, shipping, installation, rough handling, etc.

In assembling the motor drive module 32 to the plotter, the module is simply bolted to the plotter frame at the holes 44. Then, the belt 20 is assembled onto the pulleys 12, 18, in the course of which the motor 10 is forced to the left in FIG. 1 until the belt is attached, and then released, the springs 26 pulling the motor-supported plate 21 to the right in FIG. 1 to provide the desired preloading, determining entirely by the spring tension. A typical belt tension is about 6 lbs., but this is not intended to be limiting.

All of the parts shown can be or metal. However, the ball retainer 40 can be of plastic, and it is preferred that the roller balls 46 are of a hard plastic, such as Delrin, and the plates 21 and 22 of stainless steel so that the plastic balls ride in stainless steel races 51, 52 to avoid corrosion and maintain the desired free translation o1 the plate 21 over the plate 22. As previously indicated, by constraining the spring loading to a translational movement along a line connecting the shaft centers, the initial preset loading is kept substantially constant and maintained during the product lifetime.

Another unexpected improvement is that the spring loading does not appreciably degrade or lower the natural frequencies of the drive system. The typical system is in a closed loop system in which a servo system is used to control drive position. If significant resonant peaks in motor movement were created at frequencies below about 200-300 Hz, this could limit the operation of the servo control. With the motor drive system according to the invention described above, we have found that any resonant peaks created are also shifted to a safe range above about 300 Hz.

Figure 5:
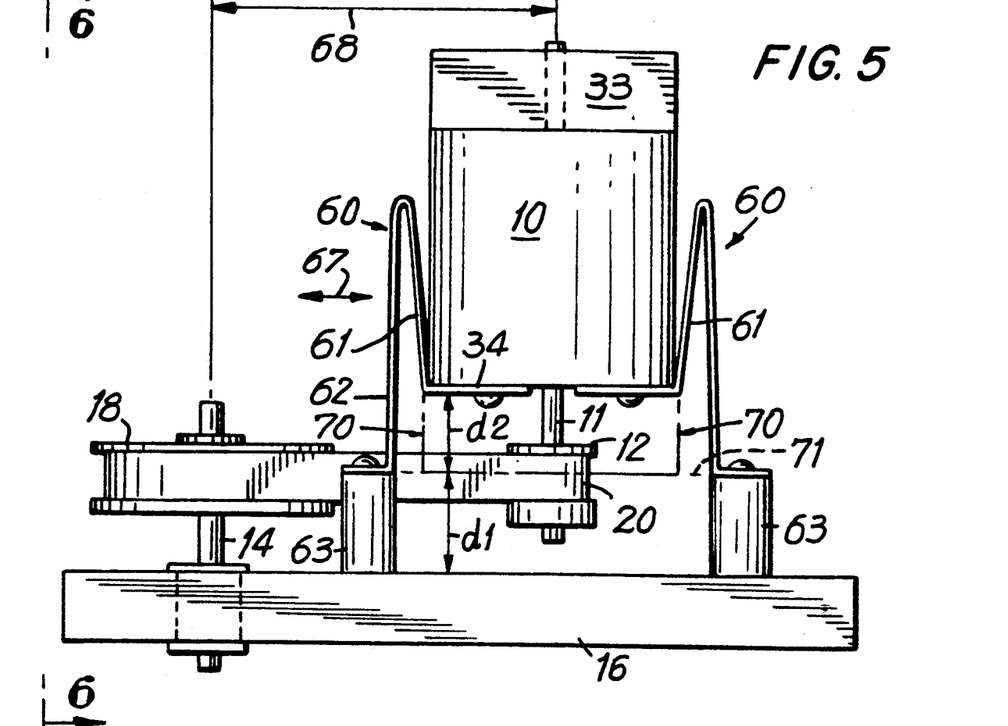
FIG. 5 is a side view of another form of spring-loaded belt-pulley drive mechanism in accordance with the invention.
Figure 6:
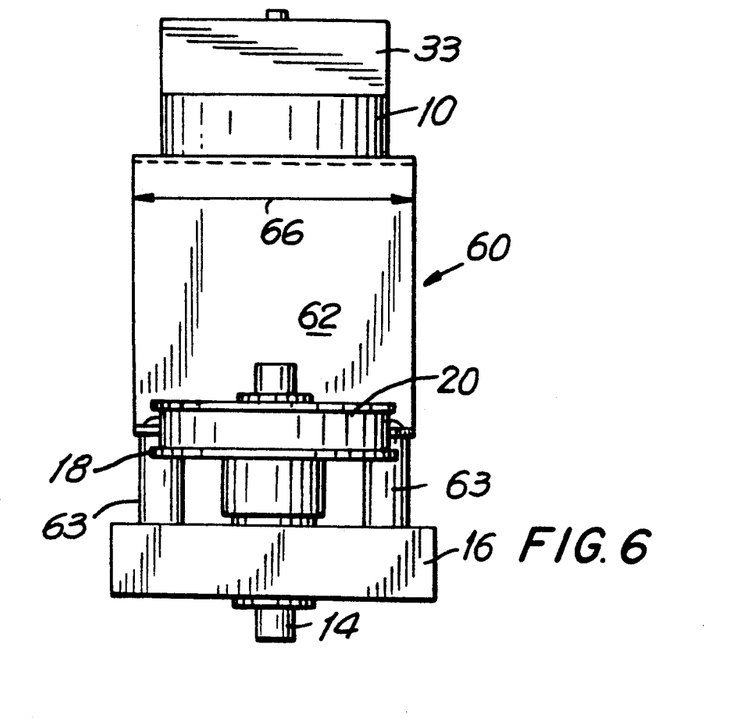
FIG. 6 is a view of the embodiment of FIG. 5 along the line 6—6.

FIGS. 5 and 6 show a second embodiment which functions in a similar manner but is based on a different motor mount. The same reference numerals are used for co responding elements. In this embodiment, the spring loading is provided by two folded leaf springs 60, each bolted at its short leg 61 to the motor housing 34, and by its long leg 62 to respective stand-offs 63 mounted on the plotter frame 16. As will be evident from the side view in FIG. 6, the large width indicated by 66 of each leaf spring 60 provides very high stiffness in the horizontal direction indicated by 66 in FIG. 6, whereas the folded spring has lower stiffness and thus allows motor movement in the horizontal direction indicated by 67 in FIG. 5. The axial spacing indicated at 68 determines the amount of the preload on the belt 20. The configuration of the springs 60 forms a type of parallelogram system in which extensions 70 of the short sides 61 are constrained to move in parallel to the belt axis 71. This essentially prevents rotation of the motor 10 and provides the desired torsional rigidity. The springs 60 can be made of any spring material. As shown, preferably the height d1 of the stand-offs 63 can be made substantially equal to the belt center line 71 (corresponding to a plane perpendicular to both shaft 11, 14 axes). The optimal position of the stand-offs is equal distant to the belt axis 71 as the motor mounting at 34 is to the belt axis whether on the same side or on the opposite side d2 of the belt axis. This geometry ensures that the desired single freedom translational movement does indeed extend along that belt center line 71.

While the first embodiment with the floating plates employs balls in grooved races in opposing plates to afford a low friction, translational engagement between the motor and its support, it will be understood that the invention is not limited to this construction. For example, rollers in channels or other guides means providing lateral restraint could be substituted. The second embodiment using a motor suspended on the leaf springs integrates the constrained translational movement and the spring biasing into the leaf spring geometry, thereby eliminating the need for some of the movable parts of the first embodiment. However, this second embodiment which achieves simplicity may impose other restraints, such as, for example, that the same spring action must not only constrain movements in all but the one desired translational direction, but also supply the particular value of belt tension needed in the implementation. While the folded parallelogram configuration of the leaf springs 60 is preferred, because of compactness, this is not essential. A parallelogram configuration that is not folded will also be satisfactory, provided that the parallelogram is oriented to the belt centerline.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. A plotter comprising a housing and means on the housing for moving media or a pen along an axis, said moving means comprising:
   (a) an electrical motor having a first shaft and adapted to rotate its first shaft in response to electrical signals,
   (b) a second shaft connected to the media or pen for driving same when rotated,
   (c) means for mounting the motor on the plotter housing,
   (d) a drive belt interconnecting the first and second shafts,
   (e) means for accurately tensioning the drive belt, said tensioning means including means for spring-loading said mountinng means in a direction to tension the belt such that said mounting means is capable of substantially only a single degree of freedom in its motion.

2. The plotter of claim 1, wherein the single degree of freedom is a translational movement along a line connecting the centers of the first and second shafts.

3. The plotter of claim 1, wherein the tension means comprises means for connecting the mounting means to the housing in a torsionally-rigid manner.

4. The plotter of claim 1, wherein an optical encoder is connected to the motor for use in a closed loop servo system.

5. A plotter comprising a housing and means on the housing for moving media or a pen alog an axis, said moving means comprising;
   (a) an electrical motor having a first shaft and adapted to rotate its first shaft in response to electrical signals,
   (b) a second shaft connected to the media or pen for driving same when rotated,
   (c) means for mounting the motor on the plotter housing,
   (d) a drive belt interconnecting the first and second shafts,
   (e) means for accurately tensioning the drive belt, said tensioning mean sincluding means for spring-loading said mounting means in a direction to tension the belt such that said mounting means is capable of substatially only a single degree of freedom in its motion; and
   bearing means between said mounting means and the plotter housing, said bearing means comprising grooved races, and roller balls in the races.

6. The plotter of claim 5, further comprising a frame wherein comprises a first plate connected to the motor and an opposed second plate connected to the housing.

7. The plotter of claim 6, wherein grooved races are formed in each of the plates for supporting roller balls.

8. The plotter of claim 7, wherein the spring-loading comprises spring means connected between the first and the second plates.

9. The plotter of claim 8, wherein said races are of stainless steel, and the roller balls are of plastic.

10. The plotter of claim 25, wherein the grooved races have axes parallel to a line connecting the centers of the first and second shafts.

11. A plotter comprising a housing and means on the housing for moving media or a pen along an axis, said moving means comprising:
    (a) an electrical motor having a first shaft and adapted to rotate its first shaft in response to electrical signals,
    (b) a second shaft connected to the media or pen for driving same when rotated,
    (c) means for mounting the motor on the plotter housing,
    (d) a drive belt interconnecting the first and second shafts,
    (e) means for accurately tensioning the drive belt, said tensioning means including means comprising leaf springs for spring-loading the mounting means in a direction to tension the belt such that the mounting mean is capable of substantially only a single degree of freedom in its motion, the single degree of freedom being a translational movement along a line connecting the centers of the first and second shafts.

12. The plotter of claim 11 wherein the leaf springs are in a parallelogram configuration oriented to the belt centerline.

13. A plotter comprising a housing and means on the housing for moving media or a pen along an axis, said moving means comprising:
    (a) an electrical motor having a first shaft and adapted to rotate its first shaft in response to electrical signals,
    (b) a second shaft connected to the media or pen for driving same when rotated,
    (c) means for mounting the motor on the plotter housing,
    (d) a drive belt interconnecting the first and second shafts,
    (e) means for accurately tensioning the drive belt, said tensioning means including means for spring-loading the mounting means in a direction to tension the belt such that the mounting mount is capable of substantially only a single degree of freedom in its motion, the single degree of freedom being a translational movement along a line connecting the centers of the first and second shafts, said means for spring-loading comprising generally folded leaf springs having a first leg connected to the motor and a second leg mounted to the plotter housing.

14. The plotter of claim 27, wherein the leaf springs are relatively wide in a direction transverse to a line connecting the first and second shafts to provide greater stiffness in that transverse direction.

15. The plotter of claim 1, wherein means are provided for mounting the end of the second leg at a leaf substantially in line with the belt center line.

16. A belt-pulley self-contained drive system comprising:
    (a) an electrical motor having a first shaft for receiving a pulley and belt and adapted to rotate its first shaft in response to electrical signals,
    (b) means for mounting the motor on apparatus,
    (c) means for accurately tensioning the belt when connected, said tensioning means including means for springloading the motor with respect to said, mounting means in a direction to tension the belt such that said mounting means is capable of substantially only a single degree of freedom in its motion.

17. The drive system of claim 16, wherein the single degree of freedom is a translation movement.

18. The drive system of claim 17, wherein the tensioning means comprises means for connecting said mounting means to the motor in a torsionally-rigid manner.

19. The system of claim 18, wherein the tensioning means comprises a first plate connected to the motor and an opposed second plate for mounting the system.

20. A belt-pulley self-contained drive system comprising:
    (a) an electrical motor having a first shaft for receiving a pulley and belt and adapted to rotate its first shaft in response to electrical signals,
    (b) means for mounting the motor on apparatus,
    (c) means for accurately tensioning the belt when connected, said tensioning means including means for spring-loading the motor with respect to said mounting means in a direction to tension the belt such that the mounting means is capable of substantially only a single degree of freedom in its motion, means for connecting the mounting means to the motor in a torsionally-rigid manner, and a first plate connected to the motor and an opposed second plate for mounting the motor, said plates having grooved races formed therein for supporting and guiding roller balls, the single degree of freedom being a translation movement.

21. The system of claim 28, wherein the spring-loading comprises spring means connected between the first and the second plates.

22. The system of claim 21, wherein said races are of stainless steel, and the roller balls a&e of plastic.

23. A belt-pulley self-contained drive system comprising:
   (a) an electrical motor having a first shaft for receiving a pulley and belt and adapted to rotate its first shaft in response to electrical signals,
   (b) means for mounting the motor on apparatus,
   (c) means for accurately tensioning the belt when connected, said tensioning means including means for spring-loading the motor with respect to said mounting means in a direction to tension the belt such that the mounting means is capable of substantially only a single degree of freedom in its motion, means for connecting the mounting means to the motor in a torsionally-rigid manner, and leaf springs connected at one end to the motor, the single degree of freedom being a translational movement.

24. The system of claim 29 wherein the leaf springs have a folded shape and are relatively wide in a direction transverse to the fold.

* * * * *

UNITED STATES PATENT AND TRADEMARK OFFICE
CERTIFICATE OF CORRECTION

PATENT NO. : 5,280,309
DATED : January 18, 1994
INVENTOR(S) : Charles D. Zinsmeyer et al.

It is certified that error appears in the above-indentified patent and that said Letters Patent is hereby corrected as shown below:

Column 1, line 15, delete "plotted" and insert --plotter--;

Column 1, line 43, delete "leaded" and insert --loaded--;

Column 1, line 54, delete "or" and insert --of--.

Column 2, line 67, delete "springloaded" and insert --spring-loaded--.

Column 3, line 40, delete "apparatus," and insert --apparatus'--;

Column 3, line 42, delete "relatively" and insert --relative--.

Column 4, line 41, delete "Keviar" and insert --Kevlar--;

Column 4, line 61, delete "be" and insert --by--.

Column 5, line 16, delete "ball" and insert --balls--;

Column 5, line 35, delete "or" and insert --of--;

UNITED STATES PATENT AND TRADEMARK OFFICE
CERTIFICATE OF CORRECTION

PATENT NO. : 5,280,309
DATED : January 18, 1994
INVENTOR(S) : Charles D. Zinsmeyer et al.

It is certified that error appears in the above-indentified patent and that said Letters Patent is hereby corrected as shown below:

Column 5, line 40, delete "ol" and insert --of--;

Column 5, line 60, delete "co responding" and insert --corresponding--.

Column 6, line 65, delete "mountinng" and insert --mounting--.

Column 7, line 11, delete "alog" and insert --along--;

Column 7, line 23, delete "mean sincluding" and insert --means including--;

Column 7, line 33, after "wherein" insert --the tensioning means--.

Column 8, line 16, delete "mount" and insert --means--;

UNITED STATES PATENT AND TRADEMARK OFFICE
CERTIFICATE OF CORRECTION

PATENT NO. : 5,280,309

DATED : January 18, 1994

INVENTOR(S) : Charles D. Zinsmeyer et al.

It is certified that error appears in the above-indentified patent and that said Letters Patent is hereby corrected as shown below:

Column 8, line 39, delete "springloading" and insert --spring-loading--.

Column 9, line 7, delete "a&e" and insert --are--.

Signed and Sealed this

Twenty-third Day of April, 1996

Attest:

BRUCE LEHMAN

*Attesting Officer*    Commissioner of Patents and Trademarks